United States Patent [19]

Yoshitomi et al.

[11] Patent Number: 4,839,207
[45] Date of Patent: Jun. 13, 1989

[54] OPTICAL RECORDING MEDIUM AND PROCESS FOR PRODUCING THE SAME

[75] Inventors: Toshihiko Yoshitomi, Yokohama; Yoshimitsu Kobayashi, Tokyo; Yoshiyuki Kisaka, Yokohama; Hidemi Yoshida, Yokohama; Michikazu Horie, Yokohama; Takanori Tamura; Mitsuaki Ohgaki, both of Kanagawa, all of Japan

[73] Assignee: Mitsubishi Chemical Industries Limited, Tokyo, Japan

[21] Appl. No.: 156,014

[22] Filed: Feb. 16, 1988

Related U.S. Application Data

[63] Continuation of Ser. No. 10,732, Feb. 4, 1987, abandoned.

[51] Int. Cl.$^4$ ............................................. B32B 1/04
[52] U.S. Cl. .................................... 428/64; 428/65; 428/212; 428/213; 428/333; 428/409; 428/412; 428/422; 428/457; 428/696; 428/913; 346/76 L; 346/135.1; 369/272; 369/284; 369/288; 430/945
[58] Field of Search ............... 369/272, 284, 288; 346/76 L, 135.1; 428/64, 65, 913, 213, 333, 696, 422, 412, 457, 212, 409; 430/945

[56] References Cited

U.S. PATENT DOCUMENTS

| | | | |
|---|---|---|---|
| 4,348,461 | 9/1982 | Terao et al. | 346/135.1 |
| 4,385,305 | 5/1983 | Terao et al. | 346/135.1 |
| 4,451,914 | 5/1989 | LaBudde et al. | 346/76 L |
| 4,592,939 | 6/1986 | Temple et al. | 428/64 |
| 4,719,594 | 1/1988 | Young et al. | 346/137 |
| 4,735,888 | 4/1988 | Takeoka et al. | 346/135.1 |

FOREIGN PATENT DOCUMENTS

| | | | |
|---|---|---|---|
| 0120539 | 10/1984 | European Pat. Off. | 369/288 |
| 0031104 | 3/1978 | Japan | 369/288 |
| 0031105 | 3/1978 | Japan | 369/288 |
| 0221847 | 12/1984 | Japan | 369/288 |

OTHER PUBLICATIONS

Philips Technical Review, vol. 41, No. 11/12, 1983/84, pp. 313,324, Eindhoven, NL; L. Vriens et al "Digital Optical Recording with Tellurium Alloys".
Patent Abstracts of Japan, vol. 8, No. 217 (E-270) (1964) 4 Oct. 1984 & JP A 59 103 314 (Seiko Denshi Kogyo K.K.) 14-06-1984.
Journal of Applied Physics, vol. 50, Nov. 79, pp. 6881-6886, Tokyo, JP; M. Terao et al: "Chalcogenide thin films for laser-beam recordings by thermal creation of holes".

Primary Examiner—Ellis P. Robinson
Assistant Examiner—P. J. Ryan
Attorney, Agent, or Firm—Oblon, Spivak, McClelland, Maier & Neustadt

[57] ABSTRACT

Disclosed herein is an optical recording medium for recording informations by irradiating the optical recording medium with a laser beam to form a hole or a deformed part thereon, said optical recording medium comprising a substrate and a recording layer containing at least Te, Se and F in the amounts of from 35 to 94.9 atomic % of Te, from 5 to 25 atomic % of Se and from 0.1 to 40 atomic % of F, produced by a reactive sputtering, said Se being derived from selenium fluoride and a sputtering target of Te or a sputtering target comprising Te-Se-alloy, and a process for producing the same.

12 Claims, 3 Drawing Sheets

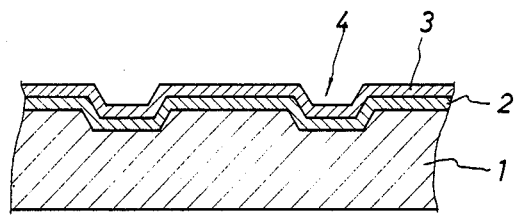
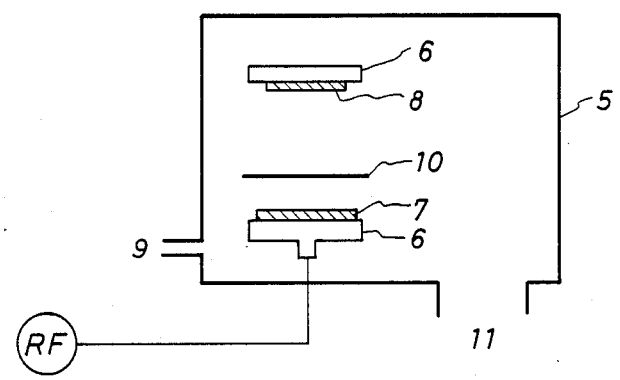

OPTICAL RECORDING MEDIUM AND PROCESS FOR PRODUCING THE SAME

This application is a continuation of Ser. No. 7/010,732, filed Feb. 4, 1987 and now abandoned.

BACKGROUND OF THE INVENTION

The present invention relates to an optical recording medium and a process for producing the same. More in detail, the present invention relates to an optical recording medium produced by irradiating a laser beam on a recording layer to heat locally for forming an ablative hole or a depression in the thus heated part, thereby recording informations, and to a reliable process for well-reproductively producing the optical recording medium.

As an optical recording medium produced by irradiating a laser beam to a thin recording layer formed on a substrate, thereby forming a hole, a depression or a protuberance thereon, it has been hitherto known to use thin Te films. Since Te is large in the light absorption coefficient, melts at a low temperature and is low thermal conductivity, Te shows a high sensitivity in the recording by the above-mentioned method. However, there is a problem that Te films tends to be oxidized rapidly in air, the degradation of the light absorption efficiency by oxidation results the degradation of recording sensitivity.

As the medium in which the degradation resistance of Te films has been improved, those using an alloy containing Se other than Te, those using lower oxides of Te, those using an organic polymer layer in which Te is dispersed, etc. have been known [for instance, refer to Japanese Patent Applications Laid-Open (KOKAI) No. 53-31104(1978), No. 58-54338(1983) and No. 57-98394(1982)].

Although, the above-mentioned recording medium is produced by a vacuum evaporation method or an ion-plating method, a sputtering method is preferably adopted because of the favorable controllability during the deposition of films.

As a result of the present inventors' studies on the films produced by sputtering of the Te or Te based materials using pure argon gas, it was found by X-ray diffraction, electron diffraction and the transmission electron microscopy that the large crystal grains of a size of from several thousands Å to several $\mu$m are observed in the whole area of these films, and that the flatness, the shape of pits and the recording sensitivity are poor and a large amount of noise is generated in a readout signal. In addition, it has been made clear that the polycrystalline structure of the deposited films is unstable and accordingly, since the reflectance increases nearly to 1.3 times as compared to the initial reflectance within 24 hours in the accelerated test at a temperature of 65° C. and a relative humidity of 80%, the stability of such a recording medium in the course of time is extremely poor.

For solving the above-mentioned problem, there is a method by which the film of recording layer has non-crystalline or microcrystalline structure and the temperature at which the above-mentioned micro-structures are transformed into the polycrystalline structure of larger grain size, that is the crystallization temperature, is made to be higher, thereby stabilizing the micro-structure of the films at room temperature. Concretely, it may be exemplified that a thin recording layer of a Te based alloy containing Ge, Pb, Sn, etc. it used [refer to Japanese Patent Publication No. 59-35356(1984)].

Furthermore, it is proposed that the same effect as above is obtained even by dispersing Te in an organic substance through the reactive sputtering [refer to Japanese Patent Applications Laid-Open (KOKAI) No. 57-165292(1982) and No. 57-78394(1982)].

However, even in the produced medium by the above-mentioned process, the change in reflectance (transmission) of the medium in the course of time occurs with the change of the micro-structure and the degradation of the medium by the long-term irradiation of readout laser light. Namely, it has been difficult to maintain the micro-structure of the recording layer in a stable state for a long-time period in the case of using a Te based alloy film as the recording layer.

On the other hand, in the optical recording medium wherein the ablative holes or the depression are formed as the pits for recording the informations, not only the recording layer but also the state of the interface between the recording layer and the substrate or the underlayer is important as the primary factor which determines the laser beam power required for forming the pit, namely, the recording sensitivity and the forms of pits.

In order to form the pits in the thin layer of the recording medium comprising the above-mentioned substrate and the thin recording layer by the laser beam, it is necessary that the materials of the recording layer which is melted locally by laser heating removed from the substrate while overcoming the work of adhesion of the film to the substrate. For the purpose of reducing the adhesion and of improving the recording sensitivity, a disposition of an underlayer comprising a thin layer of fluorocarbon polymer between the recording layer and the substrate has been examined [refer to Japanese Patent Application Laid-Open (KOKAI) No. 59-90246(1984)]. The factors contributing to the adhesion of the films to the substrate are the surface tensions of the recording layer and the substrates thereof, the molecular weight and the degree of crosslinking of the surface layer of the substrate, etc. As the work of adhesion of the recording layer to the substrate is smaller, the pit can be formed in a shorter pulse width by a smaller laser beam power. The above-mentioned fact means the improvement of the recording sensitivity, and therefore the recording of high speed and the use of a cheap semiconductor laser diode of a low output power become possible. However, in order to perform a recording of a higher quality, it is required that the sensitivity is improved but also that not only recorded pits have sharp and well-defined edges are uniform.

On the other hand, to the optical recording medium, it is required that the storage capacity is large, namely that a recording of high density is possible, in addition to the above-mentioned specific properties. In order to improve the storage capacity of the optical recording medium of the perforating type, it is required that the minimum size of the pit is as small as possible. In the case where due to the large heat conductivity of the recording layer, the region to be melted and removed by irradiation of laser beam becomes too large and in the case where due to the smallness of the adhesion of the recording layer to the underlayer, the amount of the substance to be removed becomes too large and the size of the pit is apt to be enlarged, and accordingly in such a case, high density storage is impossible.

Furthermore, in the above-mentioned media, since there is a tendency that the size of the pit changes sensitively by the slight change of the laser beam power, the stable and accurate recording of the digital signals is difficult.

In the case where a thin film of fluorocarbon polymer is provided as the underlayer, it is relatively easy to improve the recording sensitivity, however, there still remains problems concerning the above-mentioned shape and size of a pit. In Japanese Patent Application Laid-Open (KOKAI) No. 59-90246(1984), any method for dissolving the above-mentioned problem concerning the pit shape has not been given.

Furthermore, in addition to the problem concerning the above-mentioned pit shape, in the case of recording by the laser beam of short pulse width or in the case where the disk is rotated at a high constant angle velocity, since particularly in the outer region of the disk, the energy density of the laser beam focused on the unit area of the surface of the optical recording medium is small, the laser beam output necessary for forming a pit is larger, and the requirement for the improvement of the sensitivity to the optical recording medium is more severe than that of the inner region.

In order to fulfil the above-mentioned requirements, the combination of the material of the recording layer and that of the substrate or the underlayer becomes an extremely important factor. Namely, in order to shorten the length of the minimum size of pit, it is desirable that the adhesion is larger, and on the other hand, in order to improve the sensitivity, it is desirable that the adhesion is smaller. In other words, the two requirements which mutually contradict at a glance must be fulfilled. In order to overcome the above-mentioned contradiction, for instance, a method of utilizing an organic compound which decomposes and/or sublimes at a low temperature while having a high adhesion (nitrocellulose, guanine and pigments such as phthalocyanine) may be mentioned (refer to the Proceeding of XXXII Combined Recture Meeting of Applied Physics, p. 115, Spring in 1985). However, by such a method, a sufficient sensitivity and stability of the optical recording medium have not necessarily obtained. Furthermore, the physical properties of these existing organic compounds (decomposition temperature, sublimation temperature and adhesion) are specific to each of them, and it is impossible to optimize the properties of those compounds easily and flexibly corresponding to the combination of the various recording layers and the driving system.

Moreover, the above-mentioned sublimative pigments cannot be formed into a thin layer by the sputtering method and the plasma polymerization method and accordingly the constitution of a consistent dry process with forming that of the recording layer while using the sputtering method is impossible.

As a result of the inventors' further studies, it has been found that by carrying out a reactive sputtering in gaseous mixture of a selenium fluoride gas and argon gas while using an alloy containing Te and Se as a target material, the obtained optical recording medium is excellent in the recording sensitivity, the pit shape, the smoothness of the surface of the recording layer thereof, the archival stability etc. and shows the low readout noise, and based on the finding, the present invention has been attained.

SUMMARY OF THE INVENTION

In a first aspect of the present invention, there is provided an optical recording medium for recording informations by irradiating the optical recording medium with a laser beam to form a hole or a deformed part thereon, said optical recording medium comprising a substrate and a recording layer containing at least Te, Se and F in the amounts of from 35 to 94.9 atomic % of Te, from 5 to 25 atomic of Se and from 0.1 to 40 atomic % of F, produced by a reactive sputtering, said Se being derived from selenium fluoride and a sputtering target of Te or a sputtering target comprising Te-Se-alloy.

In a second aspect of the present invention, there is provided a process for producing an optical recording medium, comprising the step of carrying out a reactive sputtering in a gaseous mixture of a selenium fluoride gas and argon gas while using Te or an alloy containing Te and Se as the target material, thereby forming a deposited layer containing from 35 to 94.9 atomic % of Te, from 5 to 25 atomic % of Se and from 0.1 to 40 atomic % of F, on a substrate.

The object of the present invention is to provide an optical recording medium excellent in the recording performance such as high recording sensitivity, the good shape of the pit, the uniformaty of the microstructure of the recording layer thereof, the archival stability, etc., since the recording layer is non-crystalline or crystalline having a microcrystalline structure and an underlayer comprising a fluorocarbon polymer is disposed between the recording layer and the substrate, and to provide a reliable process for producing the above-mentioned optical recording medium well-reproducibly.

BRIEF DESCRIPTION OF THE DRAWINGS

FIG. 1 shows a longitudinal cross sectional view of an example of the optical recording media according to the present invention, FIG. 2 shows an apparatus for producing the optical recording medium according to the present invention.

DETAILED DESCRIPTION OF THE INVENTION

Figure 3:
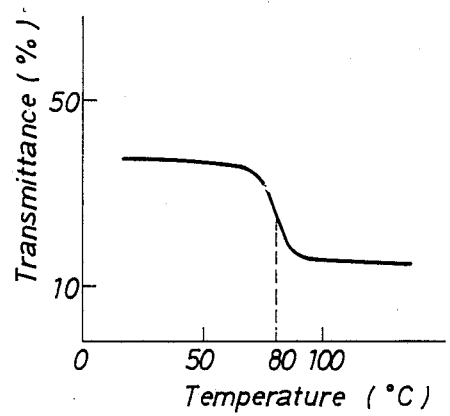
FIG. 3 shows a pattern of the temperature change to the transmission of the recording medium obtained in Example 4.

As a substrate of a recording medium according to the present invention, a plastic material such as acrylic resin, polycarbonate resin, etc., a metal such as aluminum, or glass as well as a material made by applying a thermosetting resin or photosetting resin on the above-mentioned substrate may be mentioned. Particularly, the plastic substrate have a merit of being cheap in price, easy in processing and excellent in the optical properties.

In the optical signals readout system wherein a laser beam is irradiated through the transparent substrate on the recording medium and the reflected light from recording medium is detected as is usually carried out, thereby carrying out the readout of the signals, the birefringence change of the substrate in the course of time is unfavorable, because the birefringence of the substrate becomes the considerable factor of the fluctuation of the readout light intensity.

In the recording medium according to the present invention, a cheap plastic substrate is available since the birefringence change thereof is small, and is stabilized by annealing the recording medium of a high quality and a high cost-performance can be offered.

According to the present invention, a recording layer containing Te, Se and F is deposited onto the above-mentioned substrate by a reactive sputtering method. Namely, in the process according to the present invention, the recording layer containing Te, Se and F is deposited onto the substrate by providing a glow discharge in a vacuum chamber into which a gaseous mixture comprising argon gas and a selenium fluoride gas has been introduced while using an target material comprising Te or Te and Se, thereby providing the reactive sputtering.

The thickness of the deposited recording layer made by sputtering is 150 to 1000 Å, preferably 200 to 1000 Å. In the case where the thickness thereof is less than 150 Å, a satisfactory readout signal can not be obtained since a reflection from the recording layer is low, and in the case where the thickness thereof is more than 1000 Å, the recording sensitivity of the optical recording medium becomes poor.

Te which is a component of the recording layer has been derived from the target material, and F which is also a component thereof has been derived from the fluoride gas, Se which is also a component thereof has been derived from the target material containing Te and Se or the selenium fluoride gas.

Conventional RF sputtering or DC sputtering methods are utilized to carried out the reactive sputtering.

It is necessary to maintain the temperature of the substrate at a temperature of an extent of from a room temperature to a sufficient lower temperature than the softening point of the substrate during deposition, for instance, at a temperature of an extent of from 40° to 50° C., in the case of using polycarbonate substrate. The above-mentioned temperature of the substrate is easily achieved even without cooling the substrate by a conventional magnetron-sputtering method.

As the target material, Te alone, an alloy comprising Te and Se, and an alloy comprising Te and Se as the main component and further containing Pb, Sb, Sn, In, Ge, etc. may be exemplified.

In the case where the target made of Te alone is used, there is a case that the surface of such a target is oxidized even if the target is preserved in a vacuum, and as a result, there are cases that the sputtering rate of Te fluctuates and an abnormal electric discharge is caused.

As the means of removing the oxidized layer on the surface of a target, pre-sputtering by an inert gas is generally carried out. However, since the conditions of electric discharge at the time of carrying out the pre-sputtering and the time period thereof depend on the oxidized state of the surface of the target, it is necessary to carefully carrying out the pre-sputtering.

By using the alloy containing Te and Se according to the present invention as the target, the fluctuation of the sputtering rate owing to the oxidation of the surface of the target can be prevented, and as a result, there is an effect in preventing the fluctuation of the composition of the deposited films on the above-mentioned reactive sputtering.

The alloy target containing Te and Se is easily prepared by an ordinary sintering method or melting method.

The deposition of the recording layer of the optical recording medium is carried out by a conventional sputtering apparatus of radio frequency or direct current discharge while using the above-mentioned target. The effect of making the recording medium of Te contain Se is to prevent the degradation of the recording medium itself by oxidation. For attaining such an object, in the case of using the alloy target the content of Se in the target is preferably made to be from 5 to 30 atomic %. However, since the surface tension of the recording medium at the time of melting thereof is reduced by containing of Se in the film materials, it is not favorable to make the target contain Se in an amount over 30 atomic % in the case of forming the pits by deforming the part locally irradiated by a laser beam while utilizing the surface tension of the film material. Particularly, in the case where the reduction of the surface tension of the recording layer becomes a problem, the amount of Se in the target is preferably made to be from 1 to 5 atomic %, and even by such a content of Se, there is an effect in preventing the oxidation of the surface of the target.

On the other hand, as a method of making the recording medium contain another element in addition to Te, Se and F, a method of adding the objective element into target of Te alone or the alloy target containing Te and Se may be mentioned. For instance, by addition of Pb, Sb, Sn, In, Ge, etc. into the target containing Te and Se, if desired, the specific properties of the medium for recording can be controlled.

Although $Se_2F_2$, $SeF_4$ and $SeF_6$ are mentioned as a selenium fluoride gas, $SeF_6$ is generally used, and the ratio of the selenium fluoride gas in the gaseous mixture is selected in the range of from 0.01 to 50% by volume, preferably from 0.1 to 50% by volume, more preferably from 1 to 50% by volume.

It is preferable that from 35 to 94.9 atomic % of Te atoms, from 5 to 25 atomic % of Se atoms and from 0.1 to 40 atomic % of F atoms are contained in the deposited recording layer. In the case where other fourth component is contained in the deposited recording layer, the amount of such a fourth component is preferably 1 to 20 atomic %.

In the case where Se is contained in an amount of less than 5 atomic %, the oxidation resistance of the above-mentioned recording layer is poor and the stability thereof in the course of time becomes poor. On the other hand, in the case where the content of Se is more than 25 atomic %, the energy which is necessary for forming the holes parts is raised. Namely, the recording sensitivity becomes poor.

In the case where the content of F in the deposited layer is less than 1 atomic %, the films do not take the non-crystalline structure, and in the case where the content of F is more than 40 atomic %, the substrate is apt to be damaged and moreover, the recording sensitivity becomes poor.

It has been confirmed by X-ray and electron beam diffraction method that the film according to the present invention takes an uniform non-crystalline structure. In contrary to the polycrystalline structure of the deposited layer prepared by a simple vacuum evaporation method or a sputtering method only with argon gas, the reason why the deposited film according to the present invention takes a non-crystalline structure has not necessarily been clear, however, it is considered that since the molecules of the reactive gas according to the present invention contain fluorine atom(s), fluoride ions, fluorine radicals, and Se and Te fluorides are formed in the glow discharge plasma, these fluorides impinge onto the substrate together with the atoms of Te atom and Se atom, and at the same time, etching of the glowing surface of the films occur, resulting in the prevention of the growth of the large grain.

Furthermore, the etching of the surface of the substrate slightly by the above-mentioned fluoride ions or fluorine radicals has also an effect of uniformalizing the adherence between the substrate and the deposited film.

Since in the above-mentioned non-crystalline film, grains and grain boundaries are almost negligibly small, in the case where such films are used as the recording medium, it is possible to uniformize the recording sensitivity and the shape of pits, and moreover, it is possible to reduce the readout noise in a low level due to no fluctuation of the readout light at the time of reading-out of signals by the laser beam. Accordingly, a high C/N ratio (carrier to noise ratio) can be obtained.

In addition, due to the fact that the deposited layer contains Se other than Te, the oxidation-resistance which cannot be obtained by Te alone can be obtained and the reflectivity of the above-mentioned recording medium does not change at all even after being exposed to an accelerated test for 30 days at a temperature of 70° C. and at a relative humidity of 85%.

By heating the above-mentioned recording layer to a suitable temperature, that is, by subjecting the recording medium to annealing, the micro-structure of the films is changed and as a result, it is able to increase the stability of the crystal, the recording sensitivity, the pit form, etc. in the course of time.

The recording medium before annealing according to the present invention shows a uniform non-crystalline structure, and even after the annealing, it shows a stable polycrystalline structure of grain of less than 1000 Å in the diameter. Particularly, it is possible to make the grain size to not more than several hundred Å, and the recording medium of the just-mentioned grain size does not cause any bad influence such as the occurrence of noise to the readout signal and the disorder of the shape of pits form at all.

In addition, the non-crystalline structure mentioned in the present invention means the micro-structure showing the pattern of the usual X-ray diffraction method, in which pattern any clear crystal line peak cannot be obserbed, and further means the structure in which so-called micro-crystalline of the grain diameter of several tens Å are present. Further, the polycrystalline structure of the grain size of less than 1000 Å means all the micro-structures in which the largest grain size is less than 1000 Å, and therefore includes the non-crystalline structure, the microcrystalline structure, the polycrystalline structure and the heterostructure as the mixture of the above-mentioned three structures. Such a structure can be confirmed accurately by observing the transmission image, the diffraction pattern or the lattice image of the deposited films with a transmission electron-microscopy.

The annealing may be carried out in a vacuum, a dried air on a nitrogen atmosphere, however, in order to maintain the atmosphere in a uniform state, the dried air or a nitrogen atmosphere is preferable. The annealing is carried out in the atmosphere maintained at a temperature of higher than 60° C. to less than 130° C., preferably 60° C. to 100° C. and more preferably 60° C. to 90° C. In the case of using a plastic substrate, it is preferable that the temperature of the annealing is sufficiently lower than the softening point of the plastic substrate, and for instance, a temperature of lower than 90° C. is preferable in the case of annealing a substrate made of a polycarbonate resin.

Although it is necessary to carry out the annealing until the micro-structure in the film is no more change, about 10 min is sufficient as the time of the annealing to the recording medium according to the present invention. However, in order to remove a garlic-like odor which is specific to the Te based recording medium, it is effective to carry out the annealing for about one hour.

Although the annealing may be carried out in succession after finishing the sputtering at a higher temperature than that during deposition of the films, the treated substrate is usually taken out once from the sputtering vacuum system to be cooled to room temperature and then subjected to the annealing.

Although the fluorine content in the deposited film decreases by the annealing, in order to obtain the above-mentioned stable and micro-structure after the annealing, since the fluorine atom effectively terminates dangling bond of Te, the fluorine content contained in the films is from 0.1 to 30 atomic % after the annealing. It is preferable that the above-mentioned fluorine content is from 1 to 20 atomic %, and there is a tendency in which the grain diameter of the crystals is apt to be larger than 1000 Å after the annealing in the case where the fluorine content is below 0.1 atomic %. Moreover, in the case where the fluorine content is more than 30 atomic %, the shapes of pits have serious irregularities and such a high content is not preferable. Still more, in the case where the fluorine content is more than 20 atomic %, there is a tendency of raising the crystallization temperature.

It is preferable that the micro-structure in the above-mentioned recording layer is sufficiently stabilized by the annealing at a temperature of from not less than 60° C. to less than 100° C., particularly at a temperature of not more than 90° C. By controlling the mixing ratio of the selenium fluoride gas and argon gas, it is possible to control the amorphous-to-crystalline transition temperature of the recording medium according to the present invention within the above-mentioned range.

According to the present invention, it is possible to stabilize the birefringence value of the above-mentioned plastic substrate by carrying out the annealing. Particularly, in the case of using a plastic substrate in which the birefringence in the parpendicular direction to the surface of the substrate after the annealing is not more than 30 nm, the noise due to the fluctuation of the readout signals derived from birefringence in a method of detecting the readout light through the substrate is reduced to the negligible extent.

Although in the recording medium according to the present invention, the recording layer has been diposited directly on the substrate as has been described above, it is also available to provide an underlayer between the substrate and the recording layer for the purposes of improving the recording sensitivity and the shape of pits, etc., and further, it is available to provide a protective layer on the above-mentioned recording medium for the protection of the recording medium. Particularly, it is effective to use an underlayer made of a fluorocarbon polymer.

As the underlayer of a fluorocarbon polymer, various kind are considered corresponding to the performance required to the optical recording medium which is to be obtained.

A dry-process in vacuum is favorable for producing the underlayer from the viewpoint of the uniformity of the layer, the decrease of pin-holes and the constitution of in-line process with the recording layer, and in the concrete, a plasma polymerized film of a fluorocarbon, a sputtered film of a polyfluorocarbon, a vacuum evaporated film of a polyfluorocarbon, etc. is exemplified. As the fluorocarbon, a perfluoroalkane such as $CF_4$, $C_2F_6$, etc., a perfluoroalkene such as $CF_3CFCF_2$, perfluorohexane, perfluorobenzene, etc. may be exemplified. Namely, any fluorocarbon may be used even if it is a gas or a liquid at normal temperature, provided that the fluorocarbon has an adequately high vapour pressure, glow discharge can be sustained in a vacuum chamber after filling the chamber with the vapour of the fluorocarbon at a pressure of the order of higher than $10^{-3}$ Torr and the fluorocarbon has a high degree of substitution by fluorine. The plasma polymerized film of fluorocarbon can be formed by using the above-mentioned fluorocarbon as the monomer and using a capacitively coupled electric discharge or inductively coupled electric discharge. Moreover, as another method, the films ma be deposited by the sputtering of polytetrafluoroethylene, copolymer of tetrafluoroethylene and hexafluoropropylene, copolymer of tetrafluoroethylene and perfluoroalkoxyethylene, etc. in the gasous region such as argon gas, a gaseous mixture of the inert gas and the above-mentioned monomer, etc.

Still more, it is available to carry out a vacuum evaporation, of a polyfluorocarbon, however, deposition rate of the film is generally slower than the above-mentioned two methods.

The thickness of the underlayer of the fluorocarbon polymer is ordinally 100 to 1000 Å.

The above-mentioned underlayer of the fluorocarbon polymer exerts an influence or the shape of pits, the presence or absence of remnants in the pits, the recording sensitivity of the recording medium, etc. according to the conditions of the interface between the above-mentioned underlayer and the recording layer. Accordingly, an exact evaluation concerning the composition and the structure of the underlayer surface of the fluorocarbon polymer, and a control thereof in the manufacturing step are important.

As an evaluating method, ESCA method (electron spectroscopy for chemical analysis) which can obtain extremely useful information is exemplified.

Namely, in the present invention, the composition and the structure of the underlayer of fluorocarbon polymer was evaluated by the ESCA method. According to ESCA method, the kinds of the elements, their composition and the state of chemical bonding in the vicinity of the surface of the specimen can be analyzed from the energy spectrum of the photoelectron turned out of the atoms in the compound of the specimen by the irradiation of soft X-ray.

In the present invention, the spectrum of the fluorine 1S orbital($F_{1S}$) and the spectrum of the carbon 1S orbital($C_{1S}$) on the surface of the thin film of fluorocarbon polymer before forming the recording layer thereon were determined while using the ESCA spectrometer of the type of "XSAM-800" made by SPECTROS Company. The spectrum $F_{1S}$ consists of a single peak having the center in the vicinity of 688 eV of binding energy, and the $C_{1S}$ spectrum consists of several peaks having the centers in the region of from 285 to 294 eV of binding energy. The peaks concerning the $-CF_3$ group and the $>CF_2$ groups can be discriminated particularly clearly from the other binding states. In the present invention, the peaks concerning the $-CF_3$ group and the $>CF_2$ groups may be identified by comparison with reference chemical shifts according to the method disclosed in literature (D. T. Clark and D. Shuttleworth, J. Poly. Sci., 18(80) page 27; K. Nakajima, A. T. Bell and M. Shen, J. Appl. Poly. Sci., 23(79) page 2627, etc.), the ratio of each integral peak area intensity to the whole integral intensity of $C_{1S}$ is calculated and the thus calculated ratios were made to be "$-F_3/C$" and "$>CF_2/C$". Namely, "$-F_3/C$" is the ratio of carbon atoms forming the $-F_3$ groups to total carbon atoms and "$>CF_2/C$" is the ratio of carbon atoms forming the $>CF_2$ groups to total carbon atoms. Furthermore, the ratio of the number of fluorine atoms to the number of carbon atoms can be calculated from the peak area ratio of $C_{1S}$ to $F_{1S}$.

The relationship between the composition and the structure of the obtained underlayer of fluorocarbon polymer by the above-mentioned method and the specific properties of the optical recording medium, and furthermore the controlling method of the composition and the structure thereof are explained as follows. Then, it is easily to select the most suitable composition and structure of the underlayer of the fluorocarbon polymer along each kind of the recording layer containing Te, Se and F.

Namely, the relationship between the composition of the underlayer of fluorocarbon polymer and the specific property as the optical recording medium are primarily due to the ratio (F/C) of the number of fluorine atoms to the number of carbon atoms in the surface of the underlayer which contacts to the recording layer.

In the case where the F/C ratio is less than 0.9, the effect of the improvement of the sensitivity is scarcely observed as compared to the case where the recording layer is deposited directly on the polycarbonate substrate. With the increase of the F/C ratio from 0.9, the power of the laser beam necessary for recording decreases monotonously, namely, the recording sensitivity is improved. The above-mentioned improvement of the recording sensitivity is saturated in the F/C ratio of not less than 1.4.

Further, in the case where the F/C ratio is not less than 1.4, there are no remnants in the pits and the uniform pits having smooth and well-defined rim are formed without according to the difference of the process for producing the underlayer and of the detailed morphology of the underlayer surface, and a high C/N ratio (Carrier to Noise Ratio) can be attained. Accordingly, it is suitable for offering an optical recording medium particularly high in the sensitivity and the C/N ratio to make the F/C ratio not less than 1.4.

However, in the case where the F/C ratio is more than 1.8, since the adhesion between the recording layer and the underlayer deteriorates, there is a tendency that the minimum size of the pits is apt to be enlarged in the case of forming the pits by the same laser power as compared to the case where the F/C ratio is not more than 1.8. Namely, there is a limit of carrying out the recording of high density.

In order to perform the high density recording, it is necessary to make the size of the pits to be small, and for that purpose, it is necessary to increase the work of adhesion between the recording layer and the underlayer to an extent. In the case where the F/C ratio is not less than 1.4, the adhesion is nearly constant and there is no effect of improving. By making the F/C ratio to be less than 1.4, the adhesion increase and it is possible to make the size of the pits small. Accordingly, by making the F/C ratio of not less than 0.9 to less than 1.4, the recording of high density can be attained while improving the recording sensitivity. However, in the case where the F/C ratio is not less than 0.9 to less than 1.4, there are cases where the remnants remain in the pits and the shapes of the rim reveal irregularities under conditions on preparing the layer of fluorocarbon polymer, and there are cases where a high C/N ratio can not be obtained in the case where the F/C ratio is not less than 1.4 cannot be obtained, however, the C/N ratio in case of the F/C ratio of not less than 0.9 to less than 1.4 is superior to that in case of using no underlayer.

In order to overcome the above-mentioned problems concerning the disorder of the pit shape, it is necessary to control not only the composition ratio of fluorine atom to carbon atom in the layer of fluorocarbon polymer but also the structure of the layer. Namely, the purpose is attained, in the $C_{1S}$ spectrum obtained by the ESCA method, by controlling the composition of the underlayer so that not less than 18 atomic % of the total carbon atoms construct the $-F_3$ groups and from not less than 18 to less than 40 atomic % of the total carbon atoms construct the $>CF_2$ groups.

In the case where the amount of the $>CF_2$ group is too small, the sensitivity is poor, and on the other hand, in the case where the amount thereof is too large, the size of the pits becomes too large. Namely, the above-mentioned these media are not suitable for the recording of high density. In addition, in the case where the amount of the $-F_3$ group is too small, remnants remain in the pits and the pit shape reveal irregularities. Since the irregularities are detected as the noise, the C/N ratio (Carrier to Noise Ratio) is low.

Although a particularly favorable pit shape and accordingly, a remarkable improving effect of the C/N ratio is obtained by applying the above-mentioned conditions to the thin underlayer of fluorocarbon polymer, particularly, of the F/C ratio of from not less than 0.4 to less than 1.4. An improvement of the C/N ratio can be obtained, although in a some degree, by applying the above-mentioned conditions to the case where the F/C ratio is not less than 1.4 and not more than 1.8.

Since the above-mentioned ratio (F/C) of fluorine atom to carbon atom and the construction concerning the rate of $>CF_2$ and $-F_3$ control the interface of the underlayer of fluorocarbon polymer, which contacts to the recording layer, it is enough that only the surface region of the underlayer of fluorocarbon polymer, which contacts to the recording layer, has the above-mentioned composition, and it is not necessary to make the whole underlayer of fluorocarbon polymer have the above-mentioned composition.

In the case of making the composition and structure of the underlayer comprising a thin layer of fluorocarbon polymer most suitable according to the above-mentioned results, it is necessary to take care of the combination of several recording layers and the combination with the driving system which effects the recording and readout. The thin layer of fluorocarbon polymer can be optimized flexibly by only changing the raw materials such as the gaseous monomer, the sputtering target etc. or by controlling the discharge conditions even in the case of using the same apparatus for fabricating the layer.

Furthermore, the capacitively coupled plasma polymerization can be actualized by only exchanging the target of the sputtering apparatus taking the parallel electrode structure with the material which is not subjected to sputtering such as stainless steel, and in the same sputtering apparatus, the plasma polymerization of a monomeric fluorocarbon and the sputtering of polyfluorocarbon can be carried out. The above-mentioned method has a merit of having a large for selecting the process for production and the raw material. Furthermore, it is also easy to construct an in-line process including the process for preparing the recording layer by the reactive sputtering method.

The method for controlling the composition and structure of the thin underlayer of fluorocarbon will be explained in detail as follows.

The sputtering of polyfluorocarbon (tetrafluoroethylene polymer, copolymer of tetrafluoroethylene and hexafluoropropylene, copolymer of tetrafluoroethylene and perfluoroalkoxyethylene, etc.) is carried out by introducing argon gas under a pressure of from $5 \times 10^{-3}$ to $1 \times 10^{-2}$ Torr between the parallel electrodes and applying an electric field of a radio frequency thereon.

The plasma polymerization of a fluorocarbon (tetrafluoroethylene, hexafluoropropylene, etc.) is carried out by introducing a monomeric fluorocarbon under a pressure of from $5 \times 10^{-3}$ to $1 \times 10^{-2}$ Torr also between the parallel electrodes and applying an electric field of a radio frequency thereon.

Also, the vacuum evaporation may be carried out by an electric resistance heating method. The F/C ratio in the surface layer of fluorocarbon polymer obtained by using a capacitively coupled plasma polymerization apparatus depends on the monomeric gas, the form of the apparatus, the conditions of electric discharge and particularly, on the discharge power and the pressure of the gaseous monomer, and as the F/C ratio, those in the range of from 0.2 to 1.5 are easily available. In the surface of fluorocarbon polymer layer obtained by sputtering, the F/C ratio is easily available in the range of from 1.1 to 1.8.

In order to make the ratio of the number of fluorine atoms to that of carbon atoms in the surface of the above-mentioned underlayer, which contacts to the recording layer, to be not less than 0.9, the radicals such as $-F_3$, $>CF_2$, etc. are made to be generated in numbers as large as possible and made to impinge onto the glowing surface of the films. Or else, there is a method by which the growing surface of the thin layer of fluorocarbon polymer, which has once adhered to the substrate, is made not to be exposed to high energy particles (electrons and ions) in the plasma as far as possible.

Concretely, in the sputtering method, it is preferable that F/C ratio of the target material is raised, the distance between the electrodes is also separated and the power of the electrical discharge is raised to increase the deposition rate of the layer of fluorocarbon polymer.

Still more, F/C ratio can be raised also by mixing a monomeric fluorocarbon such as $CF_4$, $C_2F_6$, etc. with the inert gas such as argon gas, etc. which is used in the sputtering. Furthermore, F/C ratio can be raised by raising F/C ratio of the evaporated polyfluorocarbon in the vacuum evaporation method.

On the other hand, in the plasma polymerization method by the inductively coupled electric discharge, the substrate is established while avoiding the internal part of the coil, wherein the density of the plasma is high, and in the plasma polymerization method by the capacitively coupled electric discharge, the distance between the parallel electrodes is separated and the substrate is established on one of the electrodes, preferably on the electrode in the earth side.

Also, the rate of the $>CF_2$ group and the $-F_3$ group can be relatively increased by using a lower electric power of discharge, a higher pressure of the gaseous substance and a higher flow rate of the gaseous substance.

The ratio of the number of fluorine atoms to that of carbon atoms in the underlayer of fluorocarbon polymer, which contacts to the recording layer, is 0.9 to 1.8, and further not less than 18 atomic % of the total carbon atoms are preferably made to constitute the $-F_3$ group and further, from not less than 18 atomic % to less than 40 atomic % of the total carbon atoms are preferably made to constitute the $>CF_2$ group. Namely, it is necessary to control the fine structure thereof shown by ESCA spectrum.

For this purpose, it is available that the structures of the plasma polymerized layer of fluorocarbon and the sputtered layer of fluorocarbon polymer reflect those of the gaseous monomer and the target material to a certain extent. In the case where the $-F_3$ groups are contained in a large amount in the gaseous monomer or in the case where the $-F_3$ groups are rich in the radicals and the ions generated in the plasma, the $-F_3$ groups are apt to be taken into the polymerized layer. For instance, in the case of using hexafluoropropylene as the monomer, it is possible to raise the rate of the $-F_3$ groups in the polymerized layer to a higher extent than in the case of using tetrafluoroethylene as the monomer. Moreover, by mixing carbon tetrafluoride with tetrafluoroethylene, the content of the $-F_3$ group in the polymerized layer can be raised also. Still more, there is a tendency that a large amount of the $>CF_2$ groups are contained in a deposited layer made from monomer gas containing the unsaturated bond. The layer deposited by sputtering of polytetrafluoroethylene also reflects the structure of the target and contains the $>CF_2$ group in a large amount, however, the ratio of the $-F_3$ group can be raised also by carrying out the reactive sputtering with a gaseous mixture obtained by mixing hexafluoropropylene or carbon tetrafluoride with argon gas.

For example, to the plasma polymerized layer of hexafluoropropylene according to the present invention, a structure which fulfills the requisites of the present invention has been obtained in the conditions of the pressure of $5 \times 10^{-3}$ to $1 \times 10^{-2}$ Torr, the flow rate of the gas of 300 to 500 cc/min (determined by capillary-type flow meter set up for argon gas) and the electric power of discharge in the range of from 100 to 200 W.

However, in the plasma polymerization and the sputtering method, it is well known that the electric discharge conditions depend on the shape and performances of the using apparatus (size and shape of the vacuum chamber, vent property, introducing method of the reactive gas, and shape, size and structure of the electrodes). Accordingly, in the above-mentioned description and Examples, concrete values of a gas pressure at the electric discharge, flow rate, electric discharge power, etc. are to be optimalized according to individual apparatus, and the present invention is not limited by the above-mentioned concrete values. Further, in the case of using the apparatus having the same shape, size, structure and performances, it is easily to have reproducibility.

In the present invention, a layer of chlorofluorocarbon polymer may be used as the underlayer. In such a case, it is preferable to have the layer wherein the ratio of the number of fluorine atoms to that of carbon atoms in the surface of the underlayer, which contacts to the recording layer, is 0.9 to 1.4 and it contains chlorine in an extent of from 5 to 15 atomic %.

The thin layer of chlorofluorocarbon is available by the sputtering of polychlorotrifluoroethylene, the reactive sputtering of polytetrafluoroethylene in a gaseous mixture of argon gas and a chlorofluorocarbon gas such as FRON 113 ($CCl_2F - CClF_2$) or the plasma treatment by chlorofluorocarbon of the surface of the deposited layer by sputtering of polytetrafluoroethylene. Furthermore, the thin layer of chlorofluorocarbon is available by carrying out plasma polymerization while using the chlorofluorocarbon gas as the monomer. The thickness of the above-mentioned layer is generally from 20 to 1000 Å.

In the above-mentioned thin layer of fluorocarbon polymer containing chlorine atoms, since the chlorine atom terminates dangling bonds of the carbon atoms in the same manner as in the case of fluorine atoms, the crosslinking of carbon atoms has been hindered and accordingly, the layer has a structure low in the crosslinking degree. Consequently, it is considered that the resistance in the case of removing the melted substances in the recording layer becomes small. On the other hand, since chlorine atom, in contrast with fluorine atom, has an effect on increasing the surface tension of high polymeric substances, the adhesion itself is raised to a considerable extent. In order to evaluate the adhesion of the recording layer to the underlayer according to the present invention by using a simple peeling method, it has been confirmed that the adhesion of the underlayer containing chlorine atoms is several times as large as that of the underlayer not containing chlorine atom, while both underlayers having the same ratio of F/C.

However, in the case where chlorine atoms are contained more than 15 atomic %, the adhesion thereof is reduced on the contrary.

In the case of the present invention, it is enough that the composition of the surface of the underlayer, which contacts to the recording layer, is made to be the above-mentioned composition and it is not necessary to make the composition of the whole underlayer to be the above-mentioned composition.

By subjecting the thus obtained underlayer of fluorocarbon polymer to a plasma treatment by an inert gas before forming the recording layer on the underlayer, the adhesion can be improved, the shortest pit length is shortened and on the other hand, the high sensitivity and the improvement of the shape of pit can be achieved.

In the case where the plasma treatment is utilized and the recording layer is an alloy containing Te and Se, it is more favorable to treat the layer of fluorocarbon polymer so that the ratio of the number of fluorine atoms to the number of carbon atoms in the surface of the layer of fluorocarbon polymer, which contacts to the recording layer, is from 1.0 to 1.2.

Due to the coming off of fluorine atoms, the surface tension of the surface of the layer of fluorocarbon polymer becomes larger, and moreover, due to the crosslinking of carbon atoms the density and the molecular weight of the crosslinked layer in the surface of the layer of fluorocarbon polymer are raised.

Every one of the above-mentioned changes of the surface layer has an effect of raising the adhesion between the recording layer and the underlayer. The thickness and the degree of crosslinking of the above-mentioned surface layer can be controlled by the condition of plasma discharge, particularly by the power of discharge and the time period of exposure to the plasma and the distance between the substrate and the electrode, and as a result, it is possible to control and adhesion of the recording layer to the underlayer broadly and to set each kind of the recording layer in the optimum state.

The above-mentioned effect of the plasma treatment of the surface of the thin layer of fluorocarbon polymer has been confirmed as follows.

At first, a sputtered layer of polytetrafluoroethylene (PTFE) was prepared, and the layer was subjected to the plasma treatment by argon plasma under a pressure of $5 \times 10^{-3}$ Torr at a discharge power of 100 W, and thereafter the contact angle of the layer and the atomic ratio (F/C) of fluorine atom to carbon atom within 10 nm from the surface of the layer were measured according to the ESCA method. The determination of the atomic ratio (F/C) by the ESCA method was carried out as that described before.

It has been confirmed that the contact angle and F/C ratio were reduced with the increase of the time period of the treatment. On the other hand, in the case where a recording layer of TeSe-SeF$_6$ series was formed on the plasma treated underlayer of fluorocarbon polymer, and the adhesion was measured by the simple peeling method, it was found that the adhesion was increased by several times as compared to the adhesion measured before subjecting the layer to the treatment.

In the following, the improving effect in the recording and reading-out property of the optical informations storage medium according to the present invention will be described in detail while referring to the non-limitative Examples.

EXAMPLE 1

FIG. 2 shows one example of the apparata for producing the medium for optical recording medium according to the present invention by the reactive sputtering method.

In FIG. 2, (5) is a vacuum chamber, (6) are cathode and anode electrodes, (7) is a target of an alloy containing Te and Se, (8) is a substrate, (9) is a gas inlet, (10) is a shutter and (11) is an exhaust gas outlet.

At first, the vacuum chamber (5) was evacuated to the back pressure of the order of $10^{-6}$ Torr and then, argon gas was introduced into the chamber (5) from the gas inlet (9) to raise the inner pressure of the chamber (5) to $5 \times 10^{-3}$ Torr. A radio frequency voltage at 13.56 MHz was continuously applied between the electrodes (6) to cause glow discharge, and the above-mentioned state was kept for about 10 min to clean the surface of the target (7). Thereafter, the inner space of the chamber (5) was evacuated again to the extent of $10^{-6}$ Torr, and a gaseous mixture of 90% by volume of argon and 10% by volume of gaseous SeF$_6$ was introduced into the chamber (5) from the gas inlet (9) to make the total pressure to $5 \times 10^{-3}$ Torr. Thereafter, by applying a radio frequency voltage of 50 W at 13.56 MHz between the anodic electrode (6) on the side of the substrate and the cathodic electrode (6) on the side of the target (7), thereby a glow discharge was caused for carrying out the sputtering. As the target, an alloy of 88 atomic % of Te and 12 atomic % of Se was used, and a sputtered layer of 40 nm in thickness was deposited on the substrate. The content of Se in the thus deposited layer was 15 atomic %, and the content of fluorine atom therein was 20 atomic %. Thereafter, the recording and reading-out were carried out on the thus produced optical recording medium by a semiconductor laser diode of wave length of 830 nm (pulse width of 500 n sec). A sensitivity of 4 mW and a C/N ratio (Carrier to noise ratio) of 52 dB were obtained.

EXAMPLE 2

After evacuating a vacuum chamber to $3 \times 10^{-6}$ Torr, argon gas was introduced to a pressure of $1 \times 10^{31}$ 2 Torr, and by causing a glow discharge at 100 W of a high frequency electric power of 13.56 MHz, a sputtered layer (F/C ratio of 1.6) of about 150 Å was made to deposit on a substrate of polycarbonate resin. Thereafter, the electrode of the side of the substrate was moved to right over the alloy target made of 88% of Te and 12% of Se, and after carrying out presputtering, SeF$_6$ gas was introduced into the chamber in a volume ratio of 10% to make the total pressure in the chamber to $5 \times 10^{-3}$ Torr. Thereafter, by applying a radio frequency voltage of 50 W at 13.56 MHz between the electrode on the side of the substrate and the electrode on the side of the target, thereby a glow discharge was caused for carrying out the sputtering. A sputtering layer of 40 nm in thickness was deposited on the substrate. The content of Se in the thus deposited layer was 15 atomic %, and the content of fluorine atom therein was 20 atomic %.

After that, on carrying out the recording and the reading-out on the thus fabricated optical recording medium by a semiconductor laser diode of a wave length of 830 nm (pulse width of 500 n sec), a C/N ratio of 57 dB was obtained. The recording sensitivity was 2.4 mW.

FIG. 1 shows a longitudinal cross sectional view of the thus obtained optical recording medium. In FIG. 1, (1) is a substrate, (2) is an underlayer, (3) is a recording layer and (4) is a channel for track servo.

EXAMPLE 3

By flowing 50 cc/min of monomeric tetrafluoroethylene (determined by capillary-type flow meter set up for argon gas) and 15 cc/m of argon gas through a mass-flow controller which had been calibrated to argon, the vacuum chamber was filled with the reactive gas at total pressure of $5 \times 10^{-3}$ Torr. To a capacitively coupled radio frequency voltage had been used, a radio frequency voltage of 13.56 MHz was applied to cause a glow discharge for 5 min at a discharge power of 100 W, thereby forming a plasma polymerized layer (F/C ratio of 1.1) of a thickness of about 150 Å. After that, in the same manner as in Example 2, a deposited layer of Te, Se and F was formed in a thickness of about 40 nm.

Thereafter, on carrying out the recording and reading-out on the thus produced optical recording medium in the same manner as in Example 2, a C/N ratio of 56 dB was obtained. The recording sensitivity was 3.4 mW.

COMPARATIVE EXAMPLE 1

After evacuating a vacuum chamber to $3\times 10^{-6}$ Torr, argon gas was introduced into the vacuum chamber and a glow discharge was caused between the substrate and the target by a radio frequency voltage of 50 W at 13.56 MHz.

As the target, an alloy of 85 atomic % of Te and 15 atomic % of Se was used, and a Te-Se deposite layer of 400 Å in thickness was formed on the substrate. On carrying out a recording-reading-out test by a semiconductor laser diode on the thus obtained optical recording medium, the C/N ratio was 45 dB. The recording sensitivity was 4.5 mW. There were local irregularity of recording sensitivity.

Moreover, in the case of forming a deposited layer of Te and Se by sputtering only with argon gas on the underlayer comprising a sputtered layer of fluorocarbon polymer formed in the same manner as in Example 2, the C/N ratio was only 45 dB. In addition, the recording sensitivity was 4 mW.

EXAMPLES 4 to 6, COMPARATIVE EXAMPLES 2 and 3

The vacuum chamber was evacuated to the extent of $10^{-6}$ Torr, and then $SeF_6$ gas to argon gas was introduced thereinto at a flow ratio shown in Table 1, and by applying a high frequency voltage between the electrodes in the same manner as in Example 1, an electric discharge was caused.

The discharge power and the pressure within the vacuum chamber were the same as shown in Table 1. Further, glass substrates of a thickness of 12 mm were used. The thickness of each of the deposited layer by sputtering was from 300 to 400 Å. The fluorine content (shown by atomic %) of the layer after annealing was the same as that shown in Table 1. In order to evaluate the annealing temperature necessary for stabilizing the crystal structure of the deposited layer by sputtering, the dependencies of the transmission of recording layer on temperature were measured. As an example of the pattern of the temperature change of the transmission, the pattern of a specimen of Example 4 in Table 1 in the case of raising a temperature at 13° C./min is shown in FIG. 3. It has been confirmed by the X-ray and electron beam diffraction and the transmission electron microscopic image that the rapid change of the transmissivity in the narrow temperature range as that shown in FIG. 3 is due to the change of micro-structure of the layer, that is, the growth of the crystalline and then the saturation of reflectivity means stabilization on the microstructure. Table 1 shows the temperature at which the transmission changes, that is, the crystallization temperature of the layer (corresponding to the point on the dotted line of FIG. 3) in the case of raising a temperature at 13° C./min and the maximum value of the grain size after crystallization.

The medium for recording of Examples 4 and 5 and Comparative Example 2 and 3 was formed on the disk-shaped substrate of polycarbonate resin, wherein a hexafluoropropylene polymer as an underlayer was formed on the disk-shaped substrate of polycarbonate resin, and the change of the specific properties of the disk was examined before and after annealing, which was carried out in the air at 80° C. for one hour.

With the formation of the polycrystalline by the annealing, the reflectivity of the medium for recording became about 1.1 times of the initial value, and the thus raised value was stabilized at that level. By the above-mentioned procedure, it was possible to raise the intensity of carrier signals without increasing the noise of the readout signal.

In Examples 4 to 5, a stabilized and uniform microstructure was formed by annealing, and it does not give any unfavorable effects such as noises in the readout signal. Further, there was no local irregularity of the sensitivity and the uniform pits were formed. As a result, an improvement of from 2 to 3 dB of C/N ratio (carrier to noise ratio) was effected.

As comparative examples 2 and 3, the case where the selenium fluoride gas was not used and the case where carbon disulfide gas instead of a selenium fluoride gas were shown. In the cases of Comparative Examples 2 and 3, since the grain size thereof was large, the noise of the readout signal was high and the shape of the pits was also irregular.

As are seen in the above mentioned Examples, the grain size of the polycrystalline of the recording medium according to the present invention was externally small, and it was possible to control the crystallization temperature, particularly to not less than 90° C.

Further, the optical specific properties were quite stable in the accelerated test at 65° C. and 80% RH. Also, on examining the change in quality of the recording medium due to the repeated irradiation on the same track by the readout light, the degradation in quality of the medium before annealing began by the power of readout laser beam of 1.3 mW and the accurate readout was impossible, however, on the other hand, the quality of the medium was quite stable after the annealing.

Accordingly, it was clearly seen that the stabilization of the micro-structure of the recording medium had been sufficiently attained by the annealing.

In Example 6, the annealing at a temperature of not less than 90° C. was necessary in order to obtain the same effect as above, and such medium was not suitable for use of the substrate of polycarbonate resin, wherein a hexafluoropropylene polymer as an underlayer was formed on the disk-shaped substrate of polycarbonate resin.

TABLE 1

| No. | Composition of target | Reactive gas | Flow ratio (reactive gas/Argon gas) | Discharge power (W) | Pressure (Torr) | Content of fluorine (atomic %) | Crystallization temperature (°C.) | Crystal size (Å) | C/N (dB) |
|---|---|---|---|---|---|---|---|---|---|
| Example 4 | $Te_{90}Se_{10}$ | $SeF_6$ | 5/200 | 300 | $5 \times 10^{-3}$ | 12 | 80 | <1000 | 55 |
| Example 5 | | $SeF_6$ | 5/30 | 300 | $5 \times 10^{-3}$ | 25 | 90 | <500 | 55 |
| Example 6 | | $SeF_6$ | 30/30 | 300 | $5 \times 10^{-3}$ | 35 | 110 | <500 | 53 |
| Comparative | $Te_{88}Se_{12}$ | — | 0/30 | 300 | $5 \times 10^{-3}$ | — | Crystallized | ≦20000 | 45 |

TABLE 1-continued

| No. | Composition of target | Reactive gas | Flow ratio (reactive gas/ Argon gas) | Discharge power (W) | Pressure (Torr) | Content of fluorine (atomic %) | Crystallization temperature (°C.) | Crystal size (Å) | C/N (dB) |
|---|---|---|---|---|---|---|---|---|---|
| Example 2 | | | | | | | before annealing | | |
| Comparative Example 3 | | $CS_2$ | 5/30 | 50 | $5 \times 10^{-3}$ | — | 80 | <5000 | 50 |

EXAMPLES 7 to 10 and COMPARATIVE EXAMPLES 4 to 8

Each of several underlayers of fluorocarbon polymer shown in Table 2 was provided on a substrate (130 mm in diameter and 1.2 mm in thickness) of polycarbonate resin by the sputtering method or the plasma polymerization method.

The sputtering by the fluorocarbon polymer (tetrafluoroethylene resin, copolymer of tetrafluoroethylene and hexafluoropropylene or copolymer of tetrafluoroethylene and perfluoroalkoxyethylene) was carried out by introducing argon gas under a pressure range of from $5 \times 10^{-3}$ to $1 \times 10^{-2}$ Torr between the parallel electrodes and applying a radio frequency voltage of from 50 to 200 W at 13.56 MHz.

The plasma polymerization of the fluorocarbon (tetrafluoroethylene or hexafluoropropylene) was carried out by also introducing the gaseous monomer under a pressure range of from $5 \times 10^{-3}$ to $1 \times 10^{-2}$ Torr between the parallel electrodes and applying a radio frequency voltage of from 100 to 600 W at 13.56 MHz.

The reactive sputtering was carried out on the underlayer while using an alloy target consisting of 88% of Te and 12% of Se and introducing $SeF_6$ gas and argon gas in the same manner as in Example 1, thereby a recording layer of a thickness of about 400 Å was formed. (The composition of the thus obtained layers is the same as that of Example 1)

F/C, $CF_3/C$, $CF_2/C$, the presence or absence of the remnants in the pits and the recording sensitivity of the thus obtained recording media were measured, the results being shown in Table 2.

TABLE 2

| No. | Method for forming the underlayer | F/C | —$CF_3$/C | >$CF_2$/C | Remnants in the pits | Recording sensitivity (mV) | C/N ratio (maximum value) (dB) |
|---|---|---|---|---|---|---|---|
| Example 7 | Sputtering of polytetrafluoroethylene (discharge power of 200 W) | 1.5 | 21 | 33 | none | 2.5 | 54 |
| Comparative Example 4 | the same as above (power of 50 W) | 1.4 | 12 | 28 | yes | 3.0 | 50 |
| Example 8 | Sputtering of copolymer of tetrafluoroethylene and hexafluoropropylene (power of 200 W) | 1.7 | 22 | 38 | none | 2.3 | 54 |
| Example 9 | Sputtering of copolymer of tetrafluoroethylene and perfluoroalkoxyethylene (power of 200 W) | 1.6 | 22 | 37 | none | 2.3 | 54 |
| Comparative Example 5 | Plasma polymerization of tetrafluoroethylene (power of 100 W) | 1.1 | 15 | 20 | yes | 3.4 | 52 |
| Example 10 | Plasma polymerization of hexafluoropropylene (power of 100 W) | 1.3 | 21 | 21 | none | 3.4 | 57 |
| Comparative Example 6 | the same as above (power of 600 W) | 0.9 | 15 | 25 | yes | 3.5 | 50 |
| Comparative Example 7 | Reactive sputtering of polytetrafluoroethylene in a gaseous mixture of hexafluoropropylene and argon | 1.3 | 17 | 36 | almost none | 3.4 | 50 |
| Comparative Example 8 | Without underlayer | — | — | — | yes | 4.0 | 48 |

The recording and reading-out was carried out by a semiconductor laser beam while using the above-mentioned optical recording medium prepared on a disk-shaped substrate of polycarbonate resin of 130 mm in diameter. The power of the laser beam necessary for writing was taken as the recording sensitivity. In addition, the shapes of the thus formed pits were observed by a scanning electron microscopy (SEM) and the presence or absence of the remnants in the pit.

In the case where the remnants were absent, the rim of the pit was well-defined without any irregularity and the C/N ratio of the optical recording medium was improved by a few dB as compared to the case where the remnants were present.

EXAMPLE 11

By carrying out a sputtering on a disk-shaped substrate (diameter of 130 mm and thickness of 1.2 mm) of polycarbonate resin while using polychlorotrifluoroethylene as the target under a pressure of argon gas of $1 \times 10^{-2}$ Torr at discharge power of 100 W, an underlayer of a thickness of about 150 Å was formed. On measuring the composition of the surface of the thus formed underlayer by the ESCA method, the ratio of the number of fluorine atoms to the number of carbon atoms was 1.1 and the underlayer contained 12 atomic % of chlorine.

By sputtering $Te_{88}Se_{12}$ as the recording layer on the thus formed underlayer in a gaseous mixture of argon and $SeF_6$, a medium of $TeSe-SeF_6$ series (consisting of 15 atomic % of Se, 20 atomic % of F and the balance of Te and having a thickness of 400 Å) was prepared. On the thus prepared optical recording medium, the evaluation of the writing and reading-out properties was carried out under the following conditions.

Namely, the disk-shaped substrate was rotated at 1800 rpm, and the recording and reading-out were carried out on the tracks of the radius of about 30 mm from the rotating axis by a semiconductor laser diode of a wave length of 830 nm. The recording was carried out by a pulse light of 1.0 MHz and duty of 50%.

Figure 4:
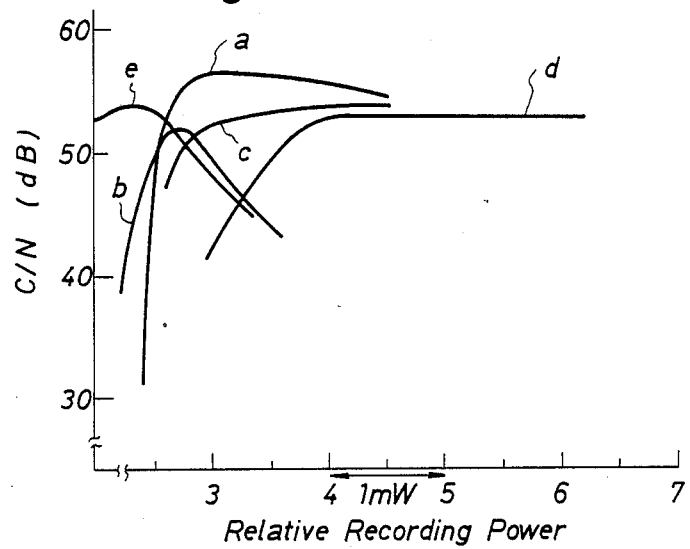
FIG. 4 shows the dependency of the C/N ratio of the recording medium obtained in Example 11 on the recording laser power and FIG. 5 shows the dependency of the C/N ratio of the recording medium obtained in Example 12 on the recording laser power.

The dependency of C/N ratio (carrier to noise ratio) on the recording power is shown in FIG. 4 (a). The C/N ratio was larger than 55 dB and showed a stable specific property within a broad range of the recording power. On carrying out the SEM observation, any remnant could scarcely be found in the pits.

COMPARATIVE EXAMPLE 9

In FIG. 4, (b) and (c) respectively show the dependency of C/N ratio on the recording power in the cases of forming the same recording layer as in Example 2 on the underlayer of polytetrafluororethylene by sputtering wherein the ratio of the number of fluorine atoms to the number of carbon atoms was 1.5 [in the case of (b)] and 1.25 [in the case of (c)]. Also in FIG. 4, (d) shows the case where the recording layer was directly formed on the substrate of polycarbonate without using an underlayer.

Further, (e) in FIG. 4 shows the case wherein a reactive sputtering of polychlorotrifluoroethylene was carried out in a gaseous mixture of argon gas and $CCl_2F-CClF_2$ to form a layer in which the ratio of the number of fluorine atoms to the number of carbon atoms was 0.85 and which contains 19 atomic % of chlorine, as the underlayer.

In the case of (b) wherein the ratio of the number of fluorine atoms to the number of carbon atoms was high, if the content of chlorine was too large as in the case of (e), the C/N ratio is rapidly reduced with the increase of the recording power. It has been understood as the result of the SEM observation that the above-mentioned fact is due to the rapid increase of pit size with the increase of the recording power. On the other hand, although the pit size is stable in the cases of (c) and (d), the amount of the remnants in the pits was large and there was much irregularity in the shape of the pits and accordingly, only a low C/N ratio was obtained in a wide range of recording power.

EXAMPLE 12

A sputtering of polytetrafluoroethylene (PTFE) was carried out under a pressure of argon gas of $1 \times 10^{-2}$ Torr and at a discharge power of 200 W to form a thin layer of a thickness of about 200 Å on a disk-shaped substrate of polycarbonate resin. Thereafter, the thus prepared material was subjected to plasma treatment under a pressure of argon gas of $5 \times 10^{-3}$ Torr at a discharge power of 50 W for 30 sec.

On the above-mentioned underlayer which had been treated, as a comparison the underlayer which had not been treated and the substrate without having any underlayer, reactive sputtering of $Te_{88}Se_{12}$ was carried out in a gaseous mixture of $SeF_6$ and argon gas, thereby forming a thin layer of a thickness of about 400 Å which contains Te and Se in the same manner as Example 1.

Figure 5:
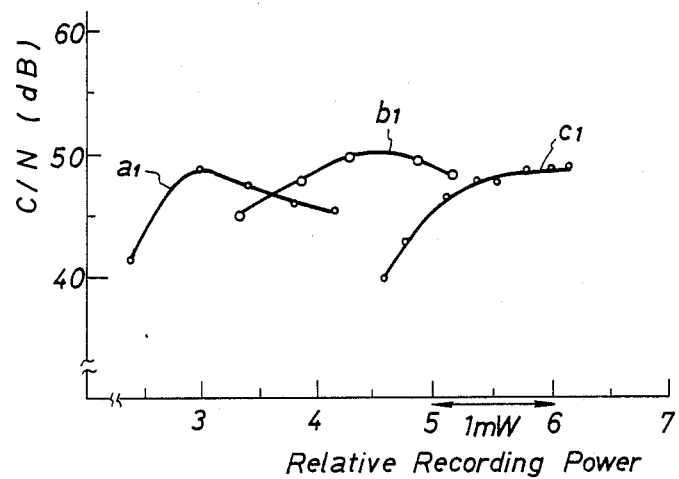

FIG. 5 shows the dependency of C/N ratio on the recording power. In FIG. 5, $a_1$ shows the case of the underlayer which has not been treated in the plasma, $b_1$ shows the case of the plasma treated underlayer and $c_1$ shows the case of without having the underlayer. The sensitivity of the medium $b_1$ was more improved than the sensitivity of the medium $c_1$, and on the other hand, C/N ratio of the medium of $b_1$ was larger than C/N ratio of the medium of $a_1$ by from 2 to 3 dB, and the dependency of C/N ratio of the medium of $b_1$ on the recording power is smaller than that of the medium of $a_1$. It was found as the result of observation of SEM that the above-mentioned facts were due to the relatively slight increase of the pit size in the medium of $b_1$ in contrast to the rapid increase of the pit size in the medium of $a_1$ with the increase of the recording power.

Furthermore, the amount of the remnants in the pits was smaller in $b_1$ than in $c_1$, and a uniform rim was formed in $b_1$.

The plasma treating conditions for obtaining the optimized property as $b_1$ can be decided by the ESCA method.

Namely, it is desirable to decide the treating conditions and the treating time period so that the ratio of the number of fluorine atoms to the number of carbon atoms in the layer within 10 nm from the treated surface is from 1.0 to 12.

EXAMPLE 13

A substrate of polymethyl methacrylate resin (PMMA) or polycarbonate resin (PC) which had been preliminarily washed was set in a vacuum room, and after evacuating to about $1 \times 10^{-6}$ Torr, 20 cc/min of argon (determined by capillary-type flow meter) and 5 cc/min of $SeF_6$ (determined by capillary-type flow meter set up for argon) were introduced into the room to raise the inner pressure thereof to about $5 \times 10^{-3}$ Torr. As a target material, Te was used. On carrying out the reactive sputtering while using a high frequency power of 50 W for 15 sec between the electrodes of a distance of 80 mm, a deposited layer of about 250 Å in thickness was obtained.

In the case of recording the thus obtained layer (recording layer) by using a semiconductor laser diode of an output of 4 mW at 830 nm, on recording the layer deposited on the PMMA substrate, the pits were formed by the pulse width of 200 nsec, and on the layer deposited on the PC substrate, the pits were formed by the pulse width of 250 nsec.

Further, after preserving the thus prepared specimens in an accelerating atmosphere of 60° C. and 80% RH for one month, the light reflectivity (in the extent of 30%) at 830 nm did not show any change before and after the acceleration.

What is claimed is:

1. An optical recording medium for recording informations by irradiating the optical recording medium with a laser beam to form a hole or a deformed part thereon, said optical recording medium comprising a substrate and a recording layer having a thickness of 150 to 1,000 Å containing at least Te, Se and F in the amounts of from 35 to 94.9 atomic % of Te, from 5 to 25 atomic % of Se and from 0.1 to 40 atomic % of F, produced by a reactive sputtering, said Se being derived from a gaseous mixture comprising 0.01 to 50% by volume of selenium fluoride and a sputtering target comprising Te-Se-alloy.

2. An optical recording medium according to claim 1, wherein an underlayer comprising a fluorocarbon polymer is provided between said substrate and said recording layer, the atomic ratio of fluorine to carbon in the part of said underlayer in the surface of said underlayer, which the surface contacts to said recording layer being 0.9 to 1.8 as the measured value according to ESCA method.

3. An optical recording medium according to claim 2, wherein said underlayer comprising a fluorocarbon is a sputtered film of polytetrafluoroethylene or a plasma polymerized film of hexafluoropropylene.

4. An optical recording medium according to claim 2, wherein not less than 18% of carbon atoms in total carbon atoms at the surface of said underlayer, which the surface contacts to said recording layer, construct $-F_3$ group and from not less than 18% to less than 40% of carbon atoms in total carbon atoms at the surface of said underlayer, which the surface contacts to said recording layer, construct $>CF_2$ group.

5. An optical recording medium according to claim 1, wherein an underlayer comprising a chlorofluorocarbon polymer is disposed between said substrate and said recording layer, the atomic ratio of fluorine to carbon in the surface of said underlayer, which the surface contacts to said recording layer, being 0.9 to 1.4 and said surface containing from 5 to 15 atomic % of chlorine.

6. An optical recording medium according to claim 1, wherein the rate of said selenium fluoride gas in said gaseous mixture is from 0.1 to 50% by volume.

7. An optical recording medium according to claim 6, wherein the rate of said selenium fluoride gas in said gaseous mixture is from 1 to 50% by volume.

8. An optical recording medium for recording informations by irradiating the optical recording medium with a laser beam to form a hole or a deformed part thereon, said optical recording medium comprising a substrate and a recording layer containing at least Te, Se and F in the amounts of from 35 to 94.9 atomic % of Te, from 5 to 25 atomic % of Se and from 0.1 to 40 atomic % of F, produced by a reactive sputtering, using a target of Te.

9. An optical recording medium according to claim 8, wherein an underlayer comprising a fluorocarbon polymer is provided between said substrate and said recording layer, the atomic ratio of fluorine to carbon in the part of said underlayer in the surface of said underlayer, which the surface contacts to said recording layer being 0.9 to 1.8 as the measured value according to ESCA method.

10. An optical recording medium according to claim 9, wherein said underlayer comprising a fluorocarbon is a sputtered film of polytetrafluoroethylene or a plasma polymerized film of hexafluoropropylene or tetrafluoroethylene.

11. An optical recording medium according to claim 9, wherein not less than 18% of carbon atoms in total carbon atoms at the surface of said underlayer, which the surface contacts to said recording layer, construct $-F_3$ group and from not less than 18% to less than 40% of carbon atoms in total carbon atoms at the surface of said underlayer, which the surface contacts to said recording layer, construct $>CF_2$ group.

12. An optical recording medium according to claim 8, wherein an underlayer comprising a chlorofluorocarbon polymer is disposed between said substrate and said recording layer, the atomic ratio of fluorine to carbon in the surface of said underlayer, which the surface contacts to said recording layer, being 0.9 to 1.4 and said surface containing from 5 to 15 atomic % of chlorine.

* * * * *

UNITED STATES PATENT AND TRADEMARK OFFICE
CERTIFICATE OF CORRECTION

PATENT NO. : 4,839,207
DATED : June 13, 1989
INVENTOR(S) : Toshihiko YOSHITOMI, et al It is certified that error appears in the above-identified patent and that said Letters Patent is hereby corrected as shown below:

On the Title Page, Item [30], the Foreign Application Priority Data has been omitted, it should read as follows:

```
--Apr. 24, 1986  [JP] Japan ...............95264/86
  Jun. 18, 1986  [JP] Japan ...............142167/86
  Sep. 18, 1986  [JP] Japan ...............220833/86
  Dec. 18, 1986  [JP] Japan ...............302607/86
  Dec. 22, 1986  [JP] Japan ...............306073/86
  Dec. 23, 1986  [JP] Japan ...............307120/86
  Jan. 09, 1987  [JP] Japan ...............2966/87
  Jan. 23, 1987  [JP] Japan ...............13650/87--
```

Signed and Sealed this

Third Day of April, 1990

*Attest:*

HARRY F. MANBECK, JR.

*Attesting Officer*     Commissioner of Patents and Trademarks

UNITED STATES PATENT AND TRADEMARK OFFICE
CERTIFICATE OF CORRECTION

PATENT NO.  : 4,839,207
DATED       : June 13, 1989
INVENTOR(S) : TOSHIHIKO YOSHITOMI ET AL It is certified that error appears in the above-identified patent and that said Letters Patent is hereby corrected as shown below:

At Column 10, lines 14, 15 and 16, "$-F_3$" should read -- $-CF_3$ --

At Column 11, lines 27, 36 and 51, "$-F_3$" should read -- $-CF_3$ --

At Column 12, line 50, "$-F_3$" should read -- $-CF_3$ --.

At Column 13, lines 10, 19, 29, 31, 32, 35 and 39, "$-F_3$" should read -- $-CF_3$ --.

At Column 23, line 38, "$-F_3$" should read -- $-CF_3$ --.

At Column 24, line 35, "$-F_3$" should read -- $-CF_3$ --.

Signed and Sealed this

Twenty-eighth Day of August, 1990

Attest:

HARRY F. MANBECK, JR.

*Attesting Officer*                    *Commissioner of Patents and Trademarks*